(12) United States Patent
Koshelev

(10) Patent No.: US 11,146,474 B2
(45) Date of Patent: Oct. 12, 2021

(54) SYSTEMS AND METHODS FOR TESTING RESILIENCE OF A DISTRIBUTED NETWORK

(71) Applicant: Atlassian Pty Ltd, Sydney (AU)

(72) Inventor: Artem Koshelev, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 332 days.

(21) Appl. No.: 16/145,211

(22) Filed: Sep. 28, 2018

(65) Prior Publication Data

US 2020/0106691 A1   Apr. 2, 2020

(51) Int. Cl.
*H04L 12/26* (2006.01)
*G06F 9/455* (2018.01)
(Continued)

(52) U.S. Cl.
CPC .......... *H04L 43/50* (2013.01); *G06F 9/45558* (2013.01); *G06F 9/4881* (2013.01); *H04L 41/0893* (2013.01); *H04L 41/5009* (2013.01); *H04L 41/5038* (2013.01); *H04L 41/5096* (2013.01); *H04L 67/10* (2013.01); *G06F 2009/45562* (2013.01); *G06F 2009/45575* (2013.01)

(58) Field of Classification Search
CPC . H04L 43/50; H04L 41/0893; H04L 41/5009; H04L 41/5038; H04L 41/5096; H04L 67/10; G06F 9/45558; G06F 9/4881; G06F 2009/45562; G06F 2009/45575
USPC ......................................................... 709/224
See application file for complete search history.

(56) References Cited

U.S. PATENT DOCUMENTS 8,910,294 B1 * 12/2014 Sennett ............... H04L 63/1433
726/25
9,256,467 B1 * 2/2016 Singh .................... G06F 9/5055
(Continued)

OTHER PUBLICATIONS

Hochstein et al., Chaos Monkey docs, Feb. 14, 2017 https://github.com/Netflix/chaosmonkey/commit/142ec168d50131f60f-bd237ddc6c26b1527d51be?short_path=b4d68dc#diff-b4d68dc855d0f9476d3f2ee343853bd21bf82ea9960d0cf06661baa244439dd6.*
(Continued)

*Primary Examiner* — James E Springer
(74) *Attorney, Agent, or Firm* — Brownstein Hyatt Farber Schreck, LLP

(57) ABSTRACT

Method for testing the resilience of a distributed network. The distributed network comprising one or more services, each service associated with compute groups, each compute group comprising active compute instances. The method comprising: for a service from the plurality of services: retrieving test parameters, the test parameters indicating at least the schedule for performing a resilience test on the service, unique identifiers of compute groups registered for resilience testing, and the probability of terminating a compute instance; determining whether to terminate a compute instance based on the probability of terminating the compute instance; in response to determining to terminate the compute instance: randomly selecting a compute group from the compute groups registered for resilience testing; receiving a list of active compute instances for the selected group; randomly selecting an active compute instance from the list of compute instances for terminating; and causing the selected compute instance to terminate.

20 Claims, 4 Drawing Sheets

(51) Int. Cl.
*G06F 9/48* (2006.01)
*H04L 12/24* (2006.01)
*H04L 29/08* (2006.01)

(56) References Cited

U.S. PATENT DOCUMENTS

| | | | |
|---|---|---|---|
| 9,690,622 B1 * | 6/2017 | Argenti | G06F 9/5027 |
| 2012/0072571 A1 * | 3/2012 | Orzell | G06F 11/008 |
| | | | 709/224 |
| 2015/0081243 A1 * | 3/2015 | Ganai | G06F 11/3688 |
| | | | 702/123 |
| 2016/0191407 A1 * | 6/2016 | Dvorkin | G06F 9/5072 |
| | | | 709/226 |
| 2020/0067789 A1 * | 2/2020 | Khuti | G06F 16/88 |

OTHER PUBLICATIONS

Working Hard in IT, "Testing Virtual Machine Compute Resilienccy in Windows Server 2016", dated Jul. 1, 2015, 7 pages.
Azure Checklists, Contents and Introduction, dated Jan. 3, 2019, 61 pages.

* cited by examiner

SYSTEMS AND METHODS FOR TESTING RESILIENCE OF A DISTRIBUTED NETWORK

TECHNICAL FIELD

Aspects of the present disclosure are directed to distributed computer networks, and in particular to resilience testing of distributed computer applications.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

More and more software applications now operate as distributed or networked applications (either on cloud platforms or physical enterprise platforms). In distributed applications, a large application is typically built as a suite of modular components or services where each module supports a specific task. In these types of applications, the services offered by the software application may be distributed over a large number of computing devices. For example, a particular software application may be provided on a cloud platform using multiple interacting servers (web and/or application servers) and databases. The servers may be configured to receive requests from client devices, communicate with databases or other servers and provide one or more services in response to those requests.

The advantage of using networked or distributed systems is that the resources assigned to a particular task may be scaled based on demand. For example, if the number of users concurrently requesting services from the software application is high, a larger number of computing resources may be allocated to the software application. Similarly, if the number of users concurrently requesting services from a software application is low, the number of computing resources assigned to that particular application may be reduced. In such complex networked systems, the server instances/computing systems active at any given time in the network may depend on one another, sometimes in unforeseen or unintended ways, and changes to one computing instance/device may result in an unintended dependency on another. When this happens, if a particular computing resource fails, then access to the software application can be compromised and/or disrupted.

Accordingly, it is desirable to periodically monitor and test the resilience of a distributed computer application to determine whether the application backend is configured to handle network failures.

SUMMARY

The appended claims may serve as a summary of the invention.

Figure 1:
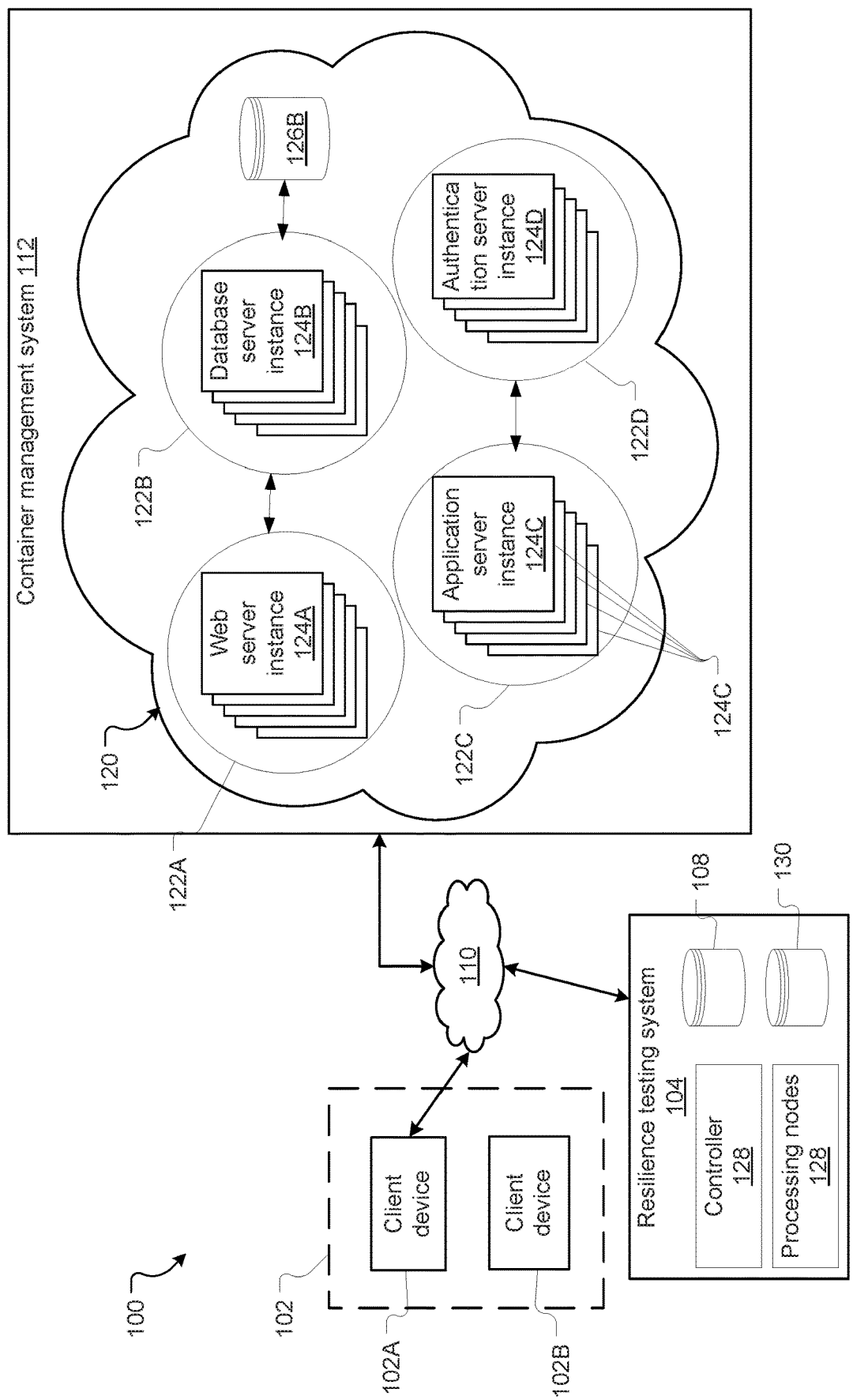
FIG. 1 is a block diagram illustrating a network environment in which aspects of the present disclosure may be implemented.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth to provide a thorough understanding of the present invention. It will be apparent, however, that the present invention may be practiced without these specific details. In some instances, well-known structures and devices are shown in block diagram form to avoid unnecessary obscuring.

In the description below, Amazon Web Service's Elastic compute cloud (EC2) is used as an example container management system for illustrative purposes. It will be appreciated that the various feature and techniques described herein could, with appropriate modifications, be used with alternative container management systems (e.g., Kubernetes).

Further, the term "service" as used throughout this disclosure refers to a particular distributed application or portion of a distributed application. Examples of services include a web version of an application, an enterprise version of the application, etc. Each service may include one or more "compute groups". A compute group as used throughout this disclosure refers to a group of identical compute instances, which are configured to handle the same type of tasks (e.g., receiving client requests, processing the request and forwarding the request to another service or compute group for further processing). In case of Amazon EC2, a compute group is often called an auto-scaling group (ASG), and in Kubernetes, a compute group is referred to as a 'Replica Set'.

Overview

Embodiments of the present disclosure provide a new method and system for testing the resiliency of a distributed network. For example, the system may be configured to terminate a compute node or instance of a running application to determine whether the remaining compute nodes or instances in the distributed network that depend on the failed compute node/instance can still function correctly (or degrade gracefully) following the failure. Thus, the testing system may observe the impact of failure of one system on other systems in the distributed network.

A previously known technique for testing the resilience of a distributed network was devised by Netflix® and is called Chaos Monkey®. Essentially Chaos Monkey works by intentionally disabling compute instances in a particular network to test how the remaining systems respond to the outage.

To understand how Chaos Monkey works, consider a situation where a particular distributed application is divided into a number of sub-processes or services and each sub-process is performed by a corresponding compute group. Accordingly, the distributed application may operate on a distributed network of compute groups (usually interdependent on each other) running in a container management system (e.g., AWS EC2). Each compute group usually includes multiple compute instances (that are provided for scaling and/or graceful degradation of the service offered by that compute group). The compute instances associated with a particular compute group are collectively referred to as a scaling group. Each scaling group (and each computing instance in the scaling group) in turn has metadata associated with it in the form of tags.

During operation, a Chaos Monkey service is included in the particular application network in the container management system and the metadata of the compute groups that need to be resilience tested is updated to indicate that testing is required for that particular compute group. Thereafter, at a scheduled time, the Chaos Monkey service requests the container management system to retrieve the metadata for all the compute groups in the distributed network, checks which compute groups require testing, randomly shuts down one or more compute instances in those compute groups, and monitors the performance of the remaining compute instances in each compute group to determine how the remaining compute instances respond to the outage.

This approach may work reasonably well when dealing with smaller distributed networks—e.g., for software applications that include limited compute groups or for businesses that offer one or two computer applications. However, this approach experiences a number of issues when dealing with large and complex distributed networks. For example, consider the example of the software company Atlassian, Inc. which hosts a large number of software applications (e.g., Bitbucket, Bamboo, Jira Service Desk, Hipchat, Stride, etc.) in multiple regions using the same container management system account. In this case, the distributed network on which their applications run may offer thousands, if not hundreds of thousands, of services and/or compute groups within a distributed network, the services being associated with different computer applications, different environments, and/or geographical regions. In such a scenario, it was found that when an approach similar to Chaos Monkey was utilized, API rate limiting was reported during the period when Chaos Monkey requested the container management system to retrieve tags for all the compute groups in the distributed network in preparation of a scheduled test.

Further, Chaos Monkey is not customizable for individual services/compute groups. Individual compute groups can either opt to be resilience tested or not, but further customization is generally not possible. For example, Chaos Monkey does not provide the capability of configuring a particular service or compute group to be tested at a different frequency than the rest of the services or compute groups or change the probability of terminating service nodes for individual services or compute groups.

To address one or more of the above-mentioned deficiencies associated with previously known resilience testing systems, aspects of the present disclosure provide a new system and method for testing the resilience of a distributed network. In particular, the disclosed network resilience testing system allows individual compute groups within a particular distributed network to customize the parameters for their resilience testing. For example, more frequent or stringent testing can be requested for a service in a production environment as opposed to the same service in a live environment.

To facilitate this, the presently disclosed resilience testing system maintains its own database of testing parameters for each service offered in the distributed network and therefore can schedule tests for specific services and/or their compute groups based on desired testing frequency, etc., without the need to request a container management system to retrieve metadata associated with each of the active compute groups in the network.

Further still, as the currently disclosed testing system does not retrieve compute group metadata from the container management system each time it conducts a resilience test, the testing system can be configured to easily operate with different container management systems.

Environment Overview

FIG. 1 illustrates a networked infrastructure 100 in which aspects of the present disclosure are implemented. The infrastructure 100 includes one or more client devices 102, a resilience testing system 104, and a container management system 112. Each of these elements communicates with other elements over one or more communication networks 110.

Generally, the systems depicted in FIG. 1 communicate with each other to schedule and conduct resilience tests on one or more compute groups within a distributed network, update the test database 108, report test results, and render dashboards displaying information about the distributed network condition to users.

In particular, the client devices 102 are configured to communicate with the resilience testing system 104 and the distributed applications hosted on the container management system 112. To enable these communications, the client devices 102 include one or more dedicated or web clients. For example, it may include a dedicated resilience testing client to communicate with the resilience testing system 104.

The resilience testing client may be in the form of an API interface configured, e.g., as a graphical user interface or a command line interface to communicate with the resilience testing system 104. In particular, the resilience testing client may be utilized to register a particular service or compute group for resilience testing, update the testing parameters for the service or compute group and view test logs. In certain embodiments, instead of a dedicated client, the client device 102 simply includes a web browser client. In this case, the client device 102 can communicate with the testing system 104 and/or applications hosted on the container management system 112 via the web browser client.

Only two client devices (102A and 102B) have been illustrated, but normal operation typically involves many more client devices connected to the various other systems in FIG. 1.

The client devices 102 may communicate with the other systems in infrastructure 100 via suitable communication networks 110. For example, the client devices 102 may communicate with the resilience testing system 104 via private or public networks, and with the container management system 112 via public networks. It will be appreciated that based on the required implementation, any suitable communication network 110 may be utilized to allow communication between the systems in environment 100.

The container management system 112 (such as Amazon Web Services EC2 Container Services, Kubernetes, etc.) is a cloud computing service that manages virtual machine instances (also referred to as compute instances in this disclosure) or containers. It enables service providers to deploy and manage scalable applications that run on groups of server instances called compute groups through application programming interface (API) calls and task definitions. In particular, the container management system 112 is responsible for initializing and terminating compute instances associated with computer applications based on demand or upon receiving instructions from the resilience testing system 104, and enable communication between client devices 102 and the services available on the compute instances of the container management system 112.

FIG. 1 further illustrates a distributed network 120 operating within the container management system 112. Illustratively, the distributed network 200 shows an example of a computing infrastructure used to provide one or more software applications to client devices 102. Accordingly, the distributed system includes multiple compute groups 122A, 122B, 122C, 122D (collectively referred to as compute groups 202).

As noted previously, the distributed network 120 may be used to provide a broad variety of computing applications to client devices 102 and therefore the distributed network 120 may include compute groups associated with different computer applications.

The number and type of compute groups in the distributed system will depend on the number of computer applications part of the distributed network, the number of geographical regions supported by the network 200, the type of environments supported by the network and so on. Only four compute groups are illustrated in FIG. 1, but it will be appreciated that the distributed network 120 can and in most instances includes many more compute groups.

For example, for a given application, the distributed network 120 may include compute groups 122 associated with a production environment and other compute groups associated with a testing environment. Further still, the same software application may have a number of compute groups 122 servicing clients in a particular geographical area (e.g., Asia pacific region), and other compute groups servicing clients in different geographical areas (e.g., North America, South America, Europe, etc.).

As shown in FIG. 1, each compute group includes multiple compute instances 124. The number of compute instances 124 in a particular compute group will depend on the demand for services offered by the compute group and may also include additional compute instances for redundancy.

In some embodiments, the compute groups 122 are auto scaling groups—i.e., the number of virtual machine instances in the compute groups may be scaled up or down based on demand. The service provider in some instances may set the minimum and/or maximum number of instances that should be provisioned for a particular compute group, based on demand for services.

In FIG. 1, compute group 122A is depicted as a web server for a particular computer application including multiple web server instances 124A for receiving web requests from client devices 102. Compute group 122B is a database server for the same computer application configured to retrieve information from associated databases, e.g., database 126B. Compute group 122C is an application server for a second computer application including multiple application server instances 124C that are configured to service API requests received from client devices 102 and compute group 122D may be an authentication server for both the first and the second computer applications.

The compute groups for the first computer application (i.e., compute groups 122A, 122B, and 122D) may interact with each other to service client requests. Similarly, the compute groups for the second computer application (i.e., compute groups 122C and 122D) may interact with each other to service client requests. For example, an initial web page for the first computer application may include a form allowing a user to submit credentials in order to access the computer application. This initial web page may be communicated from an instance of the web server 122A to a requesting client device 102. The client device 102 may add the user credentials and pass the web page back to the web server instance 124A. In turn, the web server 122A may validate the credentials by communicating with one of the database server instances 124B in compute group 122B. The database server instance 124B may retrieve information from database 126B indicating whether the user is authorized to access the computer application, determined using the credentials. Once authenticated, the web server instance 124A generates web pages showing for example a user homepage and passes these to the client device 102 for rendering.

In the present illustration, the distributed network 120 is operated/hosted by the container management system 112. It will be appreciated that this is merely one example embodiment of the present disclosure and that in other embodiments the distributed network 120 may be hosted by a physical data center hosted by the service provider. In case the computer applications are hosted from a service provider's data center, the virtual machine instances 124 generally correspond to physical computing systems in the data center.

Generally speaking, the resilience testing system 104 may be configured to evaluate the resiliency of one or more compute groups 122 in the distributed network 120. In particular, it is configured to periodically and/or randomly terminate one or more compute instances 124 of a particular compute group 122. To facilitate this, the resilience testing system 104 includes a controller 128, one or more processing nodes 129, a test database 108, and a log database 130.

The controller 128 may be configured to communicate with client devices 102, e.g., to receive test requests, process the test requests, update the test database 108, schedule tests, and communicate test results to one or more client devices 102. Scheduling tests may include retrieving testing parameters associated with the services from the database 108, creating tasks descriptors for the tests based on the retrieved parameters, and forwarding the task descriptors, e.g., to a task scheduler such as a Cron scheduler for scheduling. Each scheduled task descriptor may include test parameters indicating at least the schedule for performing a resilience test on the service, unique identifiers of one or more compute groups registered for resilience testing, and the probability of terminating a compute instance.

The processing nodes 129 may be configured to retrieve the task descriptors and execute the corresponding tasks at their scheduled times. To that end, for a particular scheduled task the processing node 129 may decide whether a compute instance 124 that is part of a registered is to be terminated, randomly select an instance 124 from the service, generate a command for terminating the selected compute instance upon deciding to terminate an instance, and record the test in the log database 130.

The test database 108 is configured to store the test parameters in respect of services. A variety of test information may be recorded and stored for a given service, e.g., against a unique service ID. For a given service group ID, such information may include, e.g., information about the compute groups associated with that particular service ID that are registered for resilience testing, information about the schedule/frequency at which resilience testing is required, the probability of terminating a compute instance 124 in a particular compute group 122 each time the test is run, and so on.

An example of a data structure storing test information is illustrated in Table A below. Although a table is used to illustrate the data structure, the relevant information need not be stored in a table and could be stored in any appropriate format.

TABLE A

Example test parameter data structure

| Service ID | ASGS | Type | Schedule | dryRun | Probability | Next scheduled execution |
|---|---|---|---|---|---|---|
| 2c934hksdk3024 | Web server, Misc Jobs, CFEvents, CFworker | Termination | 0 0/1 * * *? | True | 50 | 153741600000 |
| 9437jkfsdkj89478 | Application server, authentication server | Termination | 0 0/5 * * *? | False | 60 | 153741607834 |
| 34hfjksdhf89e74 | Web server, database server | Termination | 0 0/15 * * *? | False | 75 | 153741603725 |
| ... | ... | ... | ... | ... | ... | ... |

In the above example table, for each unique service ID, the test database 108 stores:

Compute groups: This field indicates the compute groups associated with that particular service that are part of the resilience test.

Type: this field indicates the type of resilience test required for that particular compute group. In this example, all the service providers have requested a termination type of test. However, in other examples, other types of tests, such as network latency/disruption tests can be selected.

Schedule: this field indicates the firing schedule for the resilience test, such as at 8 am every Monday through Friday or every 5 minutes. In this example, the schedule is defined using Cron expressions, Dry run: this field can be set as 'true' or 'false'. If this field is set to 'true' then no real compute instance termination would be performed during the test, but the test would be logged. This field is typically used to verify the configuration.

Probability: this field indicates the probability of terminating a compute instance in the selected compute group at the scheduled time.

Next scheduled execution: this field indicates the timestamp for the next scheduled event and it is updated by the resilience testing system 104. In the present example, the value is stored in the form of a Unix Timestamp indicating the actual time for the next scheduled test. This field is utilized to avoid outdated executions. For example, consider the situation where a new entry is created for a service in the database 108 and it is scheduled to execute at a certain time (say every morning at 9 AM). To execute this test every morning at 9 AM, the test resilience system 104 creates a scheduled task and at the time of execution forwards the scheduled task to a processing node 129 for execution. Then, consider the situation that the schedule for that task is updated from 9 AM every morning to LOAM every Monday. In this case, the tasks that were already scheduled to execute at 9 AM every morning may still inadvertently be executed. To prevent the task from executing at the incorrect time, the Next scheduled execution field is used. Basically, the processing node that is supposed to execute the task checks the Next scheduled execution field in the test database 108 before executing the task. If the value does not match the current time, the processing system cancels execution of the task.

In addition, this field allows tests between multiple compute instances to be synchronized. For example consider the situation where all scheduled tasks are stored in the test database 108 and they are assigned to processing systems for completion. In this case, if a particular processing system dies/gets terminates, all tasks that were scheduled to be executed at this processing system may also disappear. To fix this issue, each processing node 129 on startup reads the test database 108 and re-schedules the tests. This could lead to a situation where the same test may be scheduled to be executed by two different processing nodes 129. To prevent concurrent execution of the test, the first processing system that is assigned the task updates the Next scheduled execution field to the time corresponding to the next execution time. Because of this, when the second processing node 129 begins to execute the same task, it checks the next scheduled execution field in the database and because the next scheduled execution field in the database has been updated to the next scheduled time, the second processing node 129 cancels execution of that task. As noted previously, the testing system 104 decides whether to terminate and instance or not and selects an instance 124 to terminate according to the testing parameters stored in the test database 108. For a particular service, the testing parameters may specify criteria such as schedule for testing, probability for termination, etc. For example, the testing parameters may specify to select a compute group at random and select a compute instance from the selected group at random at a scheduled time.

Terminating the instance allows the service provider to evaluate the impact of the termination on the overall compute group and/or other interdependent compute groups. In particular, the service provider can monitor the state of the distributed network 120 to determine whether computer systems that depend on the terminated instance continue to function correctly (or degrade gracefully) following a random, unanticipated failure. For example, if one of the application server instances 122C is terminated, the ability of the authentication server instances 124D to continue to service data requests may be observed. The service provider may also observe the remaining application server instances 124C in the compute group 122C to determine whether they are handling requests and if the compute group has scaled in response to the termination.

In FIG. 1 the resilience testing system 104, has been depicted as a system operating outside the container management system 112. However, in some embodiments, the resilience testing system 104 is also offered as a service within the container management system 112 and may have its own compute group of computing instances/nodes.

Resilience Testing Process

Figure 2:
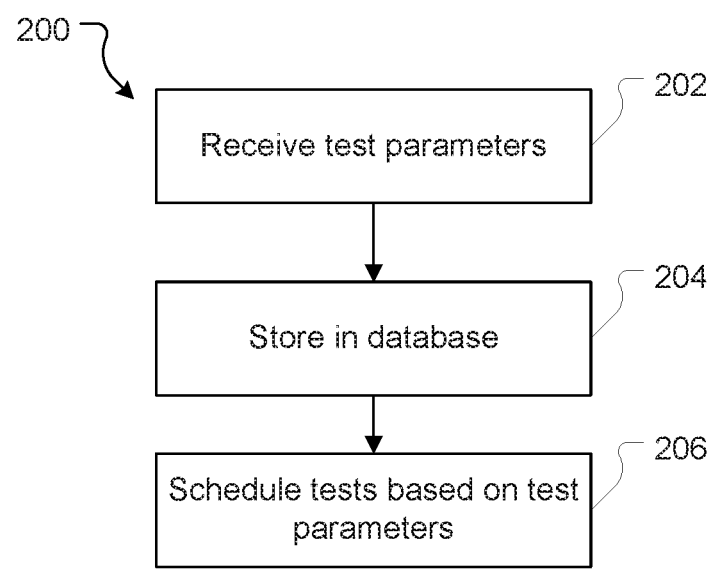
FIG. 2 is a flowchart illustrating an example method for scheduling a resilience test for a particular compute group according to some embodiments of the present disclosure.

FIG. 2 illustrates a method 200 for scheduling a resilience test for a particular service in a distributed network (e.g., distributed network 120). It will be appreciated that the present method is described for a single service for simplicity, but in actual implementation, the resilience testing system 104 is configured to schedule resilience tests of hundreds if not thousands of services.

As shown, the method 200 begins at step 202 where the resilience testing system 104 receives test parameters associated with a particular service. In certain embodiments, when adding a new service to the distributed network 120, a user of the client device 102 may set the testing parameters for the service using their client device 102. The client device 102 in turn forwards the test parameters to the resilience testing system 104. The test parameters may also be updated, for example, if new compute groups are added in the service, or to change the frequency of the tests.

In certain embodiments, the test parameters are communicated to the testing system 104 in the form of a test descriptor. The test descriptor includes information about the service for which testing is required, test parameters such as type of test, schedule, probability of terminating a compute instance, and the compute groups that are part of the service for which resilience testing is required. Accordingly, service providers can exclude any compute groups in their service they do not wish to include in the resilience test. For example, compute groups that handle mission critical function may be excluded from testing. Further, they can select test parameters to create fully-controlled, fully-random or anything-in-between resilience tests.

An example test descriptor is illustrated in Table B below. Although a table has been used to illustrate information received in the test descriptor, the relevant information need not be received in a table and could be received in any appropriate format (e.g. a simple text file, a JSON file, an XML file).

TABLE B

Example test descriptor

| | |
|---|---|
| service ID | 2c8b968b-6fe1-4876-bd8b-6f14d7067134 |
| Plan_ID | 04431e4f-f05b-4b2b-a56f-bea4474191b4 |
| Space GUID | Anystring |
| Organization GUID | Anystring |
| Type | Termination |
| Schedule | 0 0/1 * * * ? |
| Compute groups | {<br>"1942-b31c2e1--2018-04-20-01-23-utc--8tqkdiarc6cotir9--WebServer",<br>"1942-b31c2e1--2018-04-20-01-23-utc--8tqkdiarc6cotir9--MiscJobs",<br>"1942-b31c2e1--2018-04-20-01-23-utc--8tqkdiarc6cotir9--CfEvents",<br>"1942-b31c2e1--2018-04-20-01-23-utc--8tqkdiarc6cotir9--CfWorker"<br>} |
| Probability | 50 |

As shown in the table, the test descriptor includes a number of identifiers to uniquely identify the service. In one example embodiment, these identifiers include a unique identifier for the service (service ID), and one or more other identifiers such as a plan identifier (plan ID), a space identifier (space GUID), and an identifier associated with the organization providing the service (organization GUID). In addition to the identifiers, the test descriptor includes test parameters such as the type of test required, the preferred test schedule, unique identifiers for the compute groups registered for resilience testing, and the probability of terminating a compute instance. In this example, the probability is defined as a percentage. However, in other examples, the probability may be defined as a value between 0 and 1. Further, if the test is meant to execute as a dry run, the test descriptor may include a further field indicating that the test is meant to be a dry run.

At step 204, the testing system 104 (e.g., controller 128) receives the test descriptor from the client device 102 and stores it in the database 108. In particular, values corresponding to the various database fields may be retrieved from the test descriptor for storing in the database 108. In addition, the controller 128 calculates the next scheduled execution value based on the test schedule and includes this value in the database 108.

Next, at step 206, a resilience test is scheduled for the service based on the "schedule" test parameter. The example test descriptor above indicates a resilience test is required every minute. Accordingly, for the compute group associated with this example test descriptor, the testing system creates a task descriptor which can be passed to a processing node 129 for execution every 60 seconds. The task descriptor may include the test parameters required to perform the test including e.g., the service identifier, the compute groups registered for resilience testing in that service, the probability of terminating an instance, and the next scheduled execution value for that test.

Figure 3:
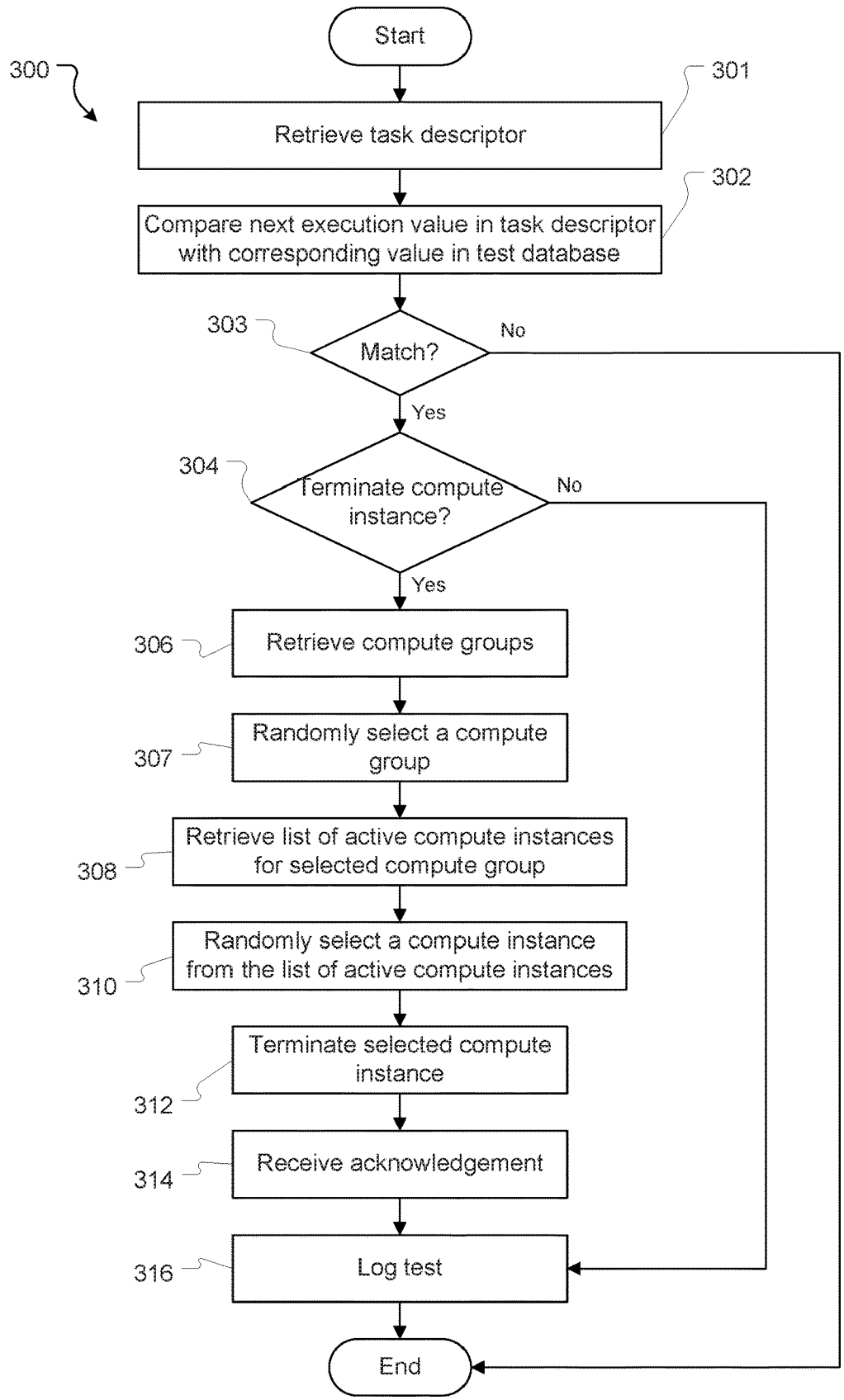
FIG. 3 is a flowchart illustrating an example method for testing the distributed network of FIG. 1 according to some embodiments of the present disclosure

FIG. 3 illustrates a method 300 for running a resilience test according to some embodiments of the present disclosure.

The method begins at step 301, where a scheduled test is initiated. To that end, a processing node 129 retrieves a scheduled task descriptor.

At step 302, the next scheduled execution value for that test is retrieved from the test database 108 and compared with the next scheduled execution value in the task descriptor.

At step 303 a determination is made whether the next scheduled execution value in the scheduled task descriptor matches the next scheduled execution value corresponding to that service in the test database 108. If the next scheduled execution values match, the method proceeds to step 304, where the processing node 129 calculates the next scheduled execution value for the service and updates the next scheduled execution field in the test database 108 with the calculated value.

At step 305, a decision is made whether a compute instance 124 needs to be terminated in this test or not. This decision is made based on the probability of terminating the instance indicated in the scheduled task. In one example, to make this decision, the processing node 129 may generate a random number, e.g., a random number between 0 and 100. If the generated number is less than or equal to the probability percentage (e.g., if the random number is any number between 0 and 50 and the probability percentage is 50%), the processing node 129 may decide to terminate a compute instance in this test. Alternatively, if the generated random number is higher than the probability percentage, (e.g., if the random number is any number between 76 and 100 and the probability percentage is 75%), the processing node 129 decides not to terminate the selected compute instance. It will be appreciated that this is one possible technique for deciding whether to terminate the selected instance or not and other decision techniques may be utilized just as easily to implement this step.

At step 305, if a decision is made to terminate an instance, the method proceeds to step 306 where the processing node 129 retrieves the list of compute groups registered for resilience testing from the scheduled task descriptor. The processing node 129 subsequently (at step 307) selects one of the compute groups from the list at random. It will be appreciated that if only one compute group is present, that compute group will be selected at this step.

Next, at step 308, the processing node 129 retrieves a list of compute instances currently active for the selected compute group. To this end, the processing node 129 may forward a unique identifier associated with the compute group ID to the container management system 112 and request the container management system 112 to provide a list of compute instances that are currently active in that particular compute group.

At step 310, the list of compute nodes is received from the container management system 112 and a random compute node is selected from that group for termination.

At step 312, the processing node 129 instructs the container management system 112 to terminate the selected compute node. For example, in case of AWS EC2, the processing node 129 may send the instance ID of the selected compute node to AWS (via its API) using the following command—
https://ec2.amazonaws.com/?Action=TerminateInstances &InstanceId.1=i-1234567890abcdef0 &AUTHPARAMS In response, AWS attempts to terminate the requested instance and if successful sends the processing node 129 an acknowledgement indicating that the selected compute instance has been terminated (at step 314). It will be appreciated that this is one method for terminating the compute instance and that in other embodiments; the resilience testing system 104 may employ other techniques for terminating the instance without departing from the scope of the present disclosure.

Subsequently (at step 316), i.e., once confirmation is received that the particular compute instance is terminated, the processing node 129 logs the test as successful and forward the test results to the controller 128, which in turn may be configured to store it in the log database 112.

In certain embodiments, the test log may be forwarded to developers or administrators associated with that particular compute group. In other embodiments, the test logs may be forwarded only if any errors are encountered (e.g., if a test did not function correctly). Furthermore, if errors are encountered, the administrators associated with the compute group and/or computer application may be alerted.

Returning to step 305, if at this step a decision is made that the selected virtual instance should not be terminated, the method 300 proceeds to step 316 where the test is logged as completed. The log may also indicate that no compute instance was terminated during the test.

Returning to step 303, if the next scheduled execution value in the scheduled task descriptor does not match the next scheduled execution value stored in the test database 108 for that service, the processing node 129 terminates the test and the method ends.

By performing the decision step at the beginning of the method, unnecessary communication with the container management system 112 (e.g., to communicate the compute group IDs and retrieve list of active compute nodes) is circumvented. Instead, the resilience testing system 104 communicates with the container management system 112 once a decision is made to terminate a compute instance and doesn't need to communicate with the container management system 112 in case a decision is made not to terminate a compute instance in the current test. In other embodiments, the decision to terminate a compute instance may be made, for example, after retrieving the list of compute instances from the container management system.

It will be appreciated that FIG. 3 illustrates the method for running one particular scheduled test for a particular compute group. This method is repeated each time the test is scheduled for that particular compute group. For example, if the frequency of testing is every 15 minutes, the method 300 will repeat every 15 minutes and in some cases the selected compute instance may be terminated and in other cases, the selected compute instance may not be terminated, thus maintaining the randomness of the resilience test. Furthermore, method 300 can be performed for scheduled tests for all the compute groups maintained by the resilience testing system.

Following method 300, if a particular compute instance has been terminated (yes path from step 305), the service provider may observe the behavior of the remaining instances (or applications) and monitor how the disappearance of the terminated instance impacts the rest of the network application. By observing the effects of the terminated instance on the rest of the compute group and/or network application, a provider can ensure that each component can tolerate any single instance disappearing without warning.

Hardware Overview

The operations/techniques described herein are implemented by one or more special-purpose computing systems or devices. For example, in networked infrastructure 100: testing system 104 may be provided by a computer system; the client devices 102 are computer systems; and the computing resources on the container management system 112 are also provided by one or more computer systems.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 4:
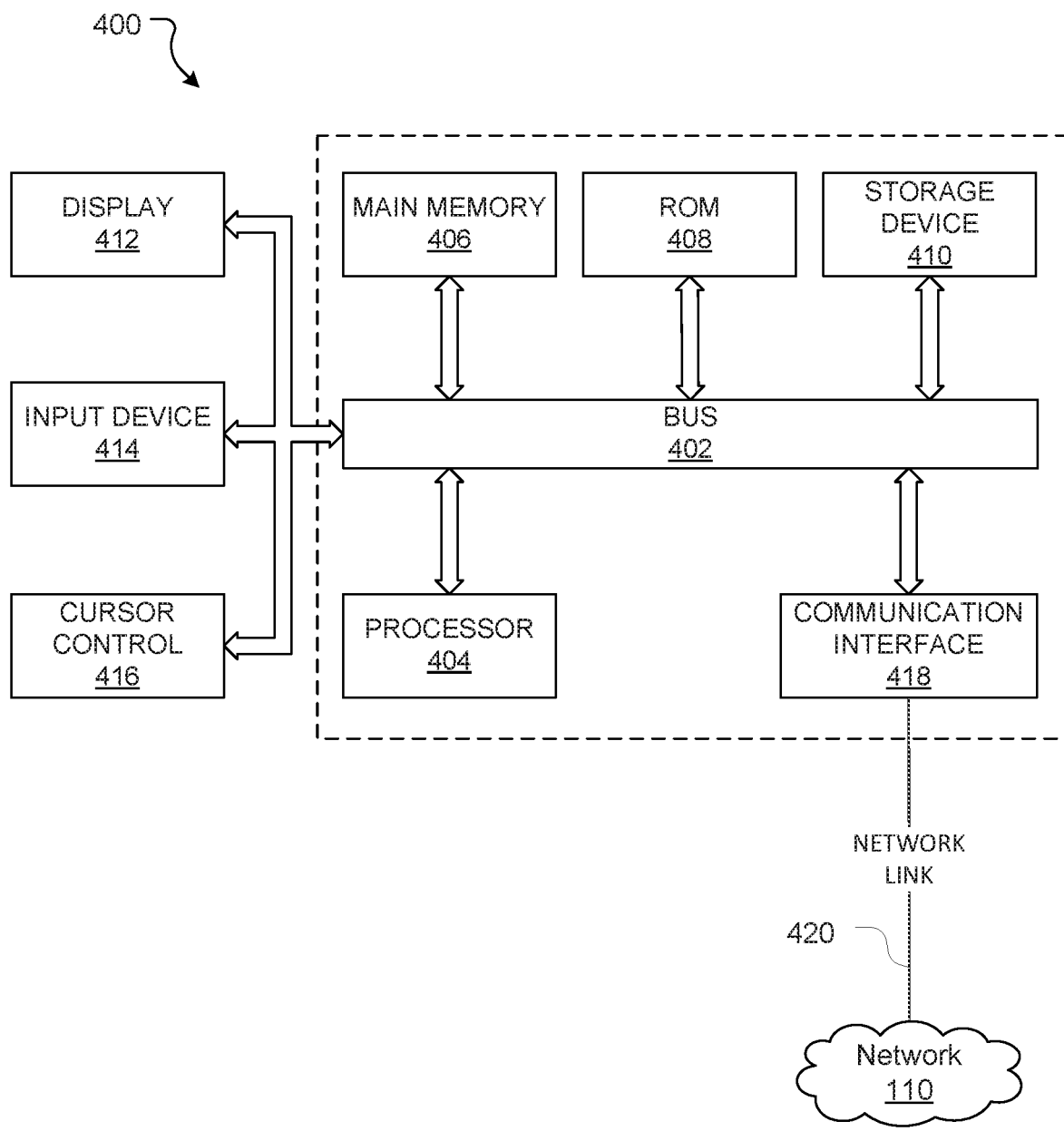
FIG. 4 is a block diagram illustrating a computer system, which may be used to implement various embodiments.

By way of example, FIG. 4 provides a block diagram that illustrates one example of a computer system 400 upon which embodiments of the invention may be implemented. Computer system 400 includes a bus 402 or other communication mechanism for communicating information, and a hardware processor 404 coupled with bus 402 for processing information. Hardware processor 404 may be, for example, a general purpose microprocessor, a graphical processing unit, or other processing unit.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

In case the computer system 400 is the client device 102, the computer system 400 may be coupled via bus 402 to a display 412 (such as an LCD, LED, touch screen display or other display), for displaying information to a computer user. An input device 414, including alphanumeric and other keys, may be coupled to the bus 402 for communicating information and command selections to processor 404. Another type of user input device is cursor control 416, such as a mouse, a trackball, or cursor direction keys for communicating direction information and command selections to processor 404 and for controlling cursor movement on display 412.

According to one embodiment, the techniques herein are performed by computer system 400 in response to processor 404 executing one or more sequences of one or more instructions contained in main memory 406. Such instructions may be read into main memory 406 from another storage medium, such as a remote database. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Computer system 400 also includes a communication interface 418 coupled to bus 402. Communication interface 418 provides a two-way data communication coupling to a network link 420 that is connected to the communication network 110. For example, communication interface 418 may be an integrated services digital network (ISDN) card, cable modem, satellite modem, etc. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Computer system 400 can send messages and receive data, including program code, through the network(s) 110, network link 420 and communication interface 418. In case the computer system hosts the testing system 104, the computer system 400 may receive a test descriptor from the client device 102 via the network 110, network link 420, and communication interface 418. The received test descriptor may be executed by processor 404 as it is received, and/or stored in test database 108, or other non-volatile storage for later execution.

As described previously, the computer system 400 as described above may be configured in a plurality of useful arrangements. In one arrangement, the computer system 400 is a server computer (such as a computer system hosting the testing system 104) comprising one or more non-transitory computer-readable data storage media stored with one or more sequences of instructions/software modules which when executed cause the computer to perform the operations/techniques that are described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using process steps. The functionality/processing of a given process step could potentially be performed in various different ways and by various different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extends to alternative combinations of two or more of the individual features mentioned or evident from the text or drawings. These different combinations constitute various alternative aspects of the embodiments.

What is claimed is:

1. A method for testing the resilience of a distributed network, the distributed network comprising one or more scalable applications, each scalable application comprising a plurality of compute groups, each compute group comprising one or more active compute instances, the plurality of compute groups being dependent on each other, the method comprising:

at a resilience testing system, for a scalable application from the one or more scalable applications:

retrieving a scheduled task descriptor, the scheduled task descriptor including test parameters, the test parameters being stored locally in a test database at the resilience testing system, the test parameters indicating at least a schedule for performing a resilience test on the scalable application, unique identifiers of the plurality of compute groups registered for resilience testing, and a probability of terminating a compute instance, wherein each respective compute group in the plurality of compute groups is assigned a respective probability of terminating the compute instance; and determining, prior to retrieving compute group data related to the resilience test from the distributed network, whether to terminate a compute instance or not based on the respective probability of terminating the compute instance;

in response to determining to terminate the compute instance:

selecting a compute group from the plurality of compute groups associated with the scalable application, the selected compute group associated with the compute instance;

requesting, from the distributed network, a list of active compute instances for the selected compute group;

randomly selecting an active compute instance from the list of active compute instances for terminating;

causing the selected active compute instance to terminate.

2. The method of claim 1, wherein the distributed network is managed by a container management system.

3. The method of claim 2, wherein requesting the list of active compute instances comprises:

requesting the container management system to forward the list of the active compute instances for the selected compute group, the request comprising an identifier of the selected compute group;

receiving the list of the active compute instances for the selected compute group in response to the request, the list comprising unique identifiers for each of the active compute instances.

4. The method of claim 2, wherein causing the selected compute instance to terminate comprises:

generating a command to terminate the randomly selected compute instance; and forwarding the command to the container management system for execution.

5. The method of claim 1, wherein deciding to terminate the compute instance further comprises:

generating a random number;

deciding to terminate the compute instance if the generated random number is lower than or equal to the probability of terminating the compute instance; and deciding not to terminate the compute instance if the generated random number is higher than the probability of terminating the compute instance.

6. The method of claim 1, wherein the scheduled task descriptor further comprises a next scheduled execution value indicating a time at which the resilience test has to be executed.

7. The method of claim 6, further comprising:

retrieving the next scheduled execution value for the resilience test from the test database;

comparing the next scheduled execution value in the scheduled task descriptor with the next scheduled execution value retrieved from the test database; and upon determining that the next scheduled execution value in the scheduled task descriptor does not match the next scheduled execution value retrieved from the test database, terminating the resilience test.

8. A resilience testing system for testing the resilience of a distributed network, the distributed network comprising one or more scalable applications, each scalable application comprising a plurality of compute groups, each compute group comprising one or more active compute instances, the resilience testing system comprising:

a test database for storing test parameters corresponding to each of the one or more scalable applications, the test parameters indicating at least a schedule for performing a resilience test on the scalable application, unique identifiers of the plurality of compute groups registered for resilience testing, and a probability of terminating a compute instance, wherein each respective compute group in the plurality of compute groups is assigned a respective probability of terminating the compute instance;

a controller for scheduling a task based on the schedule for performing the resilience test on the one or more scalable applications, the task including a task descriptor comprising at least the unique identifiers of the plurality of compute groups registered for resilience testing, and the respective probability of terminating a compute instance;

a processing node for retrieving the task descriptor for the resilience test and programmed for:

determining, prior to retrieving compute group data related to the resilience test from the distributed network, whether to terminate a compute instance or not based on the respective probability of terminating the compute instance;

in response to determining to terminate the compute instance:

selecting a compute group from the plurality of compute groups associated with the scalable application, the selected compute group associated with the compute instance;

requesting, from the distributed network, a list of active compute instances for the selected compute group;

randomly selecting an active compute instance from the list of active compute instances for terminating;

causing the selected active compute instance to terminate.

9. The system of claim 8, wherein the distributed network is managed by a container management system.

10. The system of claim 9, wherein the processing node is further configured to:

request the container management system to forward the list of the active compute instances for the selected compute group, the request comprising an identifier of the selected compute group; and receive the list of the active compute instances from the container management system for the selected compute group in response to the request, the list comprising unique identifiers for each of the active compute instances.

11. The system of claim 9, wherein in order to cause the selected compute instance to terminate, the processing node is configured to:

generate a command to terminate the randomly selected compute instance; and forward the command to the container management system for execution.

12. The system of claim 8, wherein in order to determine whether to terminate the compute instance or not, the processing node is configured to:
   generate a random number between 0 and 100;
   decide to terminate the compute instance if the generated random number is lower than or equal to the probability of terminating the compute instance; and
   decide not to terminate the compute instance if the generated random number is higher than the probability of terminating the compute instance.

13. The system of claim 8, wherein the task descriptor further comprises a next scheduled execution value indicating a time at which the resilience test has to be executed.

14. The system of claim 13, wherein the processing node further configured for:
   retrieving the next scheduled execution value for the resilience test from the test database;
   comparing the next scheduled execution value in the task descriptor with the next scheduled execution value retrieved from the test database; and
   upon determining that the next scheduled execution value in the task descriptor does not match the next scheduled execution value retrieved from the test database, terminating the resilience test.

15. A non-transitory computer readable medium comprising instructions which, when executed by a processor, cause the processor to:
   initiate a scheduled resilience test for a scalable application offered by a distributed network, the distributed network offering one or more scalable applications, each scalable application associated with a plurality of compute groups, each compute group comprising one or more active compute instances;
   retrieve a task descriptor comprising test parameters associated with the scheduled resilience test for the scalable application, the test parameters indicating at least a schedule for performing the scheduled resilience test on the scalable application, unique identifiers of the plurality of compute groups registered for resilience testing, and a probability of terminating a compute instance, wherein each respective compute group in the plurality of compute groups is assigned a respective probability of terminating the compute instance; and
   determine, prior to retrieving compute group data related to the scheduled resilience test from the distributed network, whether to terminate a compute instance or not based on the respective probability of terminating the compute instance and in response to determining to terminate the compute instance:
      select a compute group from the plurality of compute groups associated with scalable application, the selected compute group associated with the compute instance;
      request, from the distributed network, a list of active compute instances for the selected compute group;
      randomly select an active compute instance from the list of active compute instances for terminating;
      cause the selected active compute instance to terminate.

16. The non-transitory computer readable medium of claim 15, wherein the distributed network is managed by a container management system.

17. The non-transitory computer readable medium of claim 16, the instructions further cause the processor to:
   request the container management system to forward the list of the active compute instances for the selected compute group, the request comprising an identifier of the selected compute group;
   receive the list of the active compute instances for the selected compute group in response to the request, the list comprising unique identifiers for each of the active compute instances.

18. The non-transitory computer readable medium of claim 15, wherein the instructions further cause the processor to:
   generate a command to terminate the randomly selected compute instance; and
   forward the command to a container management system for execution.

19. The non-transitory computer readable medium of claim 15, wherein the instructions further cause the processor to:
   generate a random number;
   decide to terminate the compute instance if the generated random number is lower than or equal to the probability of terminating the compute instance; and
   decide not to terminate the compute instance if the generated random number is higher than the probability of terminating the compute instance.

20. The non-transitory computer readable medium of claim 15, wherein the task descriptor further comprises a next scheduled execution value indicating a time at which the scheduled resilience test has to be executed, and wherein the instructions further cause the processor to:
   retrieve the next scheduled execution value for the scheduled resilience test from a test database;
   comparing the next scheduled execution value in the task descriptor with the next scheduled execution value retrieved from the test database; and
   upon determining that the next scheduled execution value in the task descriptor does not match the next scheduled execution value retrieved from the test database, terminating the next scheduled task.

* * * * *